US010823220B2

(12) United States Patent
Krueger

(10) Patent No.: US 10,823,220 B2
(45) Date of Patent: Nov. 3, 2020

(54) THREADED FASTENER

(71) Applicant: Altenloh, Brinck & Co. U.S. Inc., Bryan, OH (US)

(72) Inventor: Derek J. Krueger, Archbold, OH (US)

(73) Assignee: Altenloh, Brinck & Co. U.S. Inc., Bryan, OH (US)

( * ) Notice: Subject to any disclaimer, the term of this patent is extended or adjusted under 35 U.S.C. 154(b) by 87 days.

(21) Appl. No.: 15/872,046

(22) Filed: Jan. 16, 2018

(65) Prior Publication Data
US 2018/0202479 A1 Jul. 19, 2018

Related U.S. Application Data

(60) Provisional application No. 62/446,664, filed on Jan. 16, 2017.

(51) Int. Cl.
F16B 25/10 (2006.01)
F16B 25/00 (2006.01)
F16B 35/06 (2006.01)

(52) U.S. Cl.
CPC ........ F16B 25/103 (2013.01); F16B 25/0031 (2013.01); F16B 25/0063 (2013.01); F16B 25/0089 (2013.01); F16B 35/06 (2013.01)

(58) Field of Classification Search
CPC .... F16B 25/103; F16B 25/0031; F16B 35/06; F16B 25/0089; F16B 25/0063
See application file for complete search history.

(56) References Cited

U.S. PATENT DOCUMENTS

| 3,358,548 | A | * | 12/1967 | Dyslin | F16B 25/0057 411/387.2 |
| 3,682,507 | A | * | 8/1972 | Waud | F16B 5/0275 411/413 |
| 3,869,219 | A | | 3/1975 | Wilson et al. | |
| 4,621,963 | A | * | 11/1986 | Reinwall | F16B 5/0275 411/369 |
| 4,726,164 | A | * | 2/1988 | Reinwall | E04D 3/36 411/511 |
| 5,625,994 | A | * | 5/1997 | Giannuzzi | E04D 3/3603 411/387.5 |
| 6,050,765 | A | * | 4/2000 | McGovern | F16B 25/0015 411/387.2 |
| 7,025,551 | B2 | | 4/2006 | Haytayan | |
| 7,090,452 | B2 | | 8/2006 | Chen | |
| 7,377,019 | B2 | * | 5/2008 | Haytayan | B25B 21/002 173/1 |
| 8,322,959 | B2 | | 12/2012 | Mair | |
| 2007/0292235 | A1 | | 12/2007 | Shinjo | |
| 2010/0183400 | A1 | | 7/2010 | Chen | |

FOREIGN PATENT DOCUMENTS

CN 101598164 B 7/2011

* cited by examiner

*Primary Examiner* — John C Hong
(74) *Attorney, Agent, or Firm* — MacMillan, Sobanski & Todd, LLC

(57) ABSTRACT

A threaded fastener is provided. The threaded fastener includes a shank having a non-threaded portion and a threaded portion. A tip extends from the threaded portion and a head extends from the non-threaded portion. A plurality of wings extend from the shank and are configured to form a passage as the threaded fastener advances. An enlarged portion is configured to seat in the passage formed by the plurality of wings with the threaded fastener in an installed arrangement.

16 Claims, 5 Drawing Sheets

THREADED FASTENER

RELATED APPLICATIONS

This application claims the benefit of U.S. Provisional Application No. 62/446,664, filed Jan. 16, 2017, the disclosure of which is incorporated herein by reference in its entirety.

BACKGROUND

In certain instances, threaded fasteners can include a first feature that self-drills a pilot hole through wood, rigid foam insulation, and into steel, and that further has a secondary feature that restricts the lateral movement of the fastener within the self-drilled pilot hole in the wood.

A threaded fastener can be used to mechanically attach rigid foam insulation panels to a number of substrates including the non-limiting examples of wood, steel, concreate and the like. When fastening to steel, a self-drilling and self-tapping fastener can be used to increase the speed of installation. To briefly describe the event, the fastener rapidly advances through the panel's outer layer of medium density wood (or engineered wood), the panel's intermediate layer of low-density foam insulation and the panel's inner layer of medium density wood (or engineered wood), but is then forced to significantly decrease its rate of advancement as it self-drills through one or more adjacent layers of steel substrate supporting the insulation panel. The issue that commonly occurs is that the threads of the fastener is still intimately engaged in the medium density wood (or engineered wood) and, as a result, forces the screw to advance through the supporting steel substrate at a constant rate. This, in turn, causes a failure of the fastener, most typically a fractured drill point tip that has been advanced far too quickly into the one or more steel substrates before the drill point has been allowed significant time to self-drill the steel substrate.

It would be advantageous if threaded fasteners could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the threaded fastener.

The above objects as well as other objects not specifically enumerated are achieved by a threaded fastener. The threaded fastener includes a shank having a non-threaded portion and a threaded portion. A tip extends from the threaded portion and a head extends from the non-threaded portion. A plurality of wings extends from the shank and are configured to form a passage as the threaded fastener advances. An enlarged portion is configured to seat in the passage formed by the plurality of wings with the threaded fastener in an installed arrangement.

The above objects as well as other objects not specifically enumerated are also achieved by a method of installing a threaded fastener. The method includes the steps of forming a passage through a panel using a threaded fastener having a tip and a plurality of wings, engaging a steel substrate with the tip and the plurality of wings such that the steel substrate causes the plurality of wings to fracture from the threaded fastener, engaging the steel substrate with a threaded portion of the threaded fastener such as to further advance the threaded fastener and receiving an enlarged portion of the threaded fastener within an outermost portion of the passage formed in the panel such that the enlarged portion provides a structure configured to resist movement of the panel in directions generally perpendicular to a longitudinal axis of the threaded fastener.

Various aspects of the threaded fastener will become apparent to those skilled in the art from the following detailed description of the illustrated embodiments, when read in light of the accompanying drawings.

DETAILED DESCRIPTION

Figure 1:
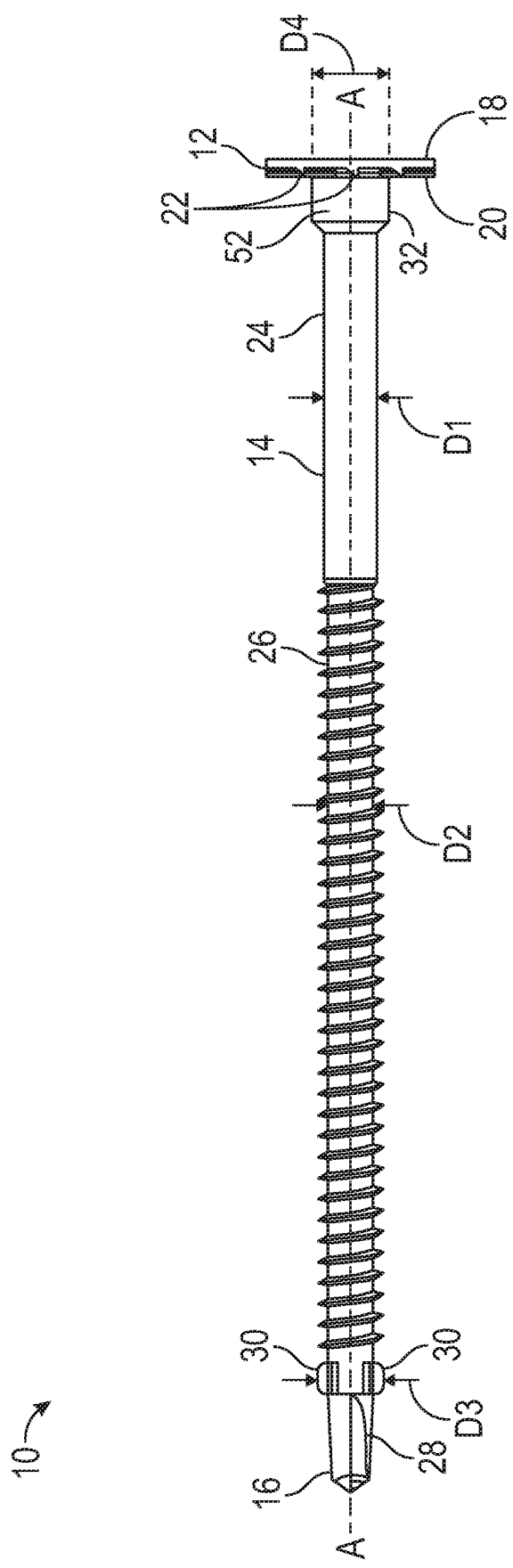
FIG. 1 is a side view of a threaded fastener in accordance with the invention.

The threaded fastener will now be described with occasional reference to the specific embodiments. The threaded fastener may, however, be embodied in different forms and should not be construed as limited to the embodiments set forth herein. Rather, these embodiments are provided so that this disclosure will be thorough and complete, and will fully convey the scope of the threaded fastener to those skilled in the art.

Unless otherwise defined, all technical and scientific terms used herein have the same meaning as commonly understood by one of ordinary skill in the art to which the threaded fastener belongs. The terminology used in the description of the threaded fastener herein is for describing particular embodiments only and is not intended to be limiting of the threaded fastener. As used in the description of the threaded fastener and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the threaded fastener. Notwithstanding that the numerical ranges and parameters setting forth the broad scope of the threaded fastener are approximations, the numerical values set forth in the specific examples are reported as precisely as possible. Any numerical values, however, inherently contain certain errors necessarily resulting from error found in their respective measurements.

The term "threaded", as used herein, is defined to mean a portion of the structure includes helical surface features configured to convert between rotational and linear movements. The term "fastener", as used herein, is defined to mean any structure, device or mechanism configured to mechanically join or affix two or more objects together. The term "wings", as used herein, is defined to mean any structure extending outwardly from a fastener.

Referring now to the drawings, there is illustrated a threaded fastener. Generally, the threaded fastener is configured to provide a clamping force to affix an insulation panel to a steel substrate. In certain instances, the insulation panel can be formed as an assembly of layers of similar and dissimilar materials. Advantageously, the threaded fastener is configured to resist movement of the insulation panel in directions generally perpendicular to a longitudinal axis of the threaded fastener.

Referring now to FIG. 1, a side elevational view of an improved structure for a threaded fastener is shown generally at 10. The threaded fastener 10 includes a head 12, a shank 14 and a tip 16. The head 12 includes an outer surface 18 that can have a feature (not shown), such as the non-limiting examples of a slot, Phillips, hex, or similar conventional structure, configured to allow torque to be applied to the threaded fastener 10 by an associated tool (not shown). Optionally, the head 12 can include an inner surface 20 configured with gripping features 22. The gripping features 22 will be discussed in more detail below.

Referring again to FIG. 1, the shank 14 is substantially cylindrical in shape and extends from the head 12 to the tip 16. The shank 14 includes a non-threaded portion 24 and a threaded portion 26. The non-threaded portion 24 extends from the head 12 to the threaded portion 26 and the threaded portion 26 extends from the non-threaded portion 24 to the tip 16. The threaded portion 26 is configured to engage a metallic substrate. While the threaded portion 26 is illustrated in FIG. 1 as having a right-handed thread, it should be appreciated that the threads can have any desired orientation sufficient to engage a metallic substrate. The threaded portion 26 will be discussed in more detail below. The non-threaded portion 24 has a first diameter D1 and the threaded portion 26 has a second diameter D2.

Referring again to FIG. 1, the tip 16 is equipped with a self-tapping drill feature 28. The self-tapping drill feature 28 is configured to drill through a metallic substrate. The self-tapping drill feature 28 is conventional in the art and can have any desired structure sufficient to drill through a metallic substrate.

Referring again to FIG. 1, one or more wings 30 are positioned between the tip 16 and the threaded portion 26 of the shank 14. In the illustrated embodiment, a quantity of two opposed wings 30 are provided. However, in other embodiments, a greater or lesser quantity of wings 30 may be provided, and the provided wings 30 can be positioned at any desired location on the threaded fastener 10.

Referring again to FIG. 1, an enlarged portion 32 is provided on the threaded fastener 10. In the illustrated embodiment, the enlarged portion 32 has a generally cylindrical shape and is provided between the head 12 and the threaded portion 26 of the shank 14. Alternatively, the enlarged portion 32 may have any desired shape, such as the non-limiting example of a square shape and may be provided at any desired location on the threaded fastener 10.

Referring again to FIG. 1, the opposed wings 30 cooperate to form a third diameter D3 that is greater than the second diameter D2 of the threaded portion 26 of the shank 14. In addition, the enlarged portion 32 forms a fourth diameter D4 that is equal to the third diameter D3 defined by the opposed wings 30.

Referring again to FIG. 1, the head 12, shank 14, tip 16 and wings 30 are radially centered about longitudinal axis A-A. The axis A-A will be discussed in more detail below.

Figure 2:
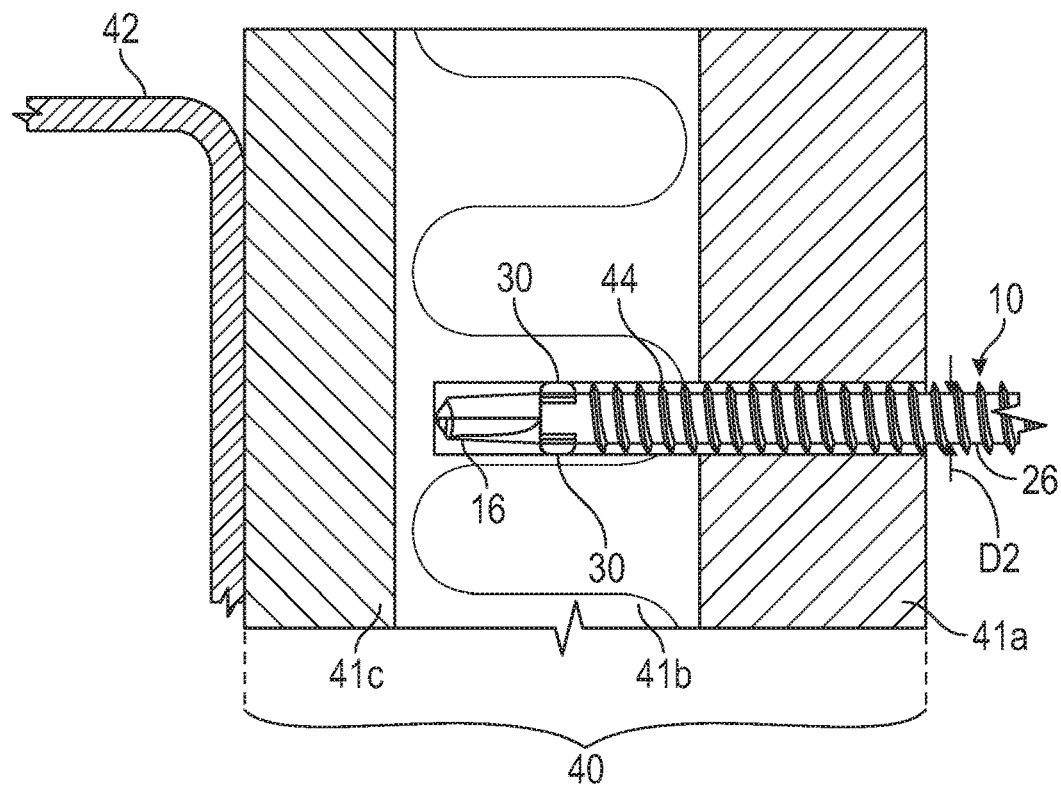
FIG. 2 is a side view of a portion of the threaded fastener of FIG. 1 illustrated in a first installation step.
Figure 3:
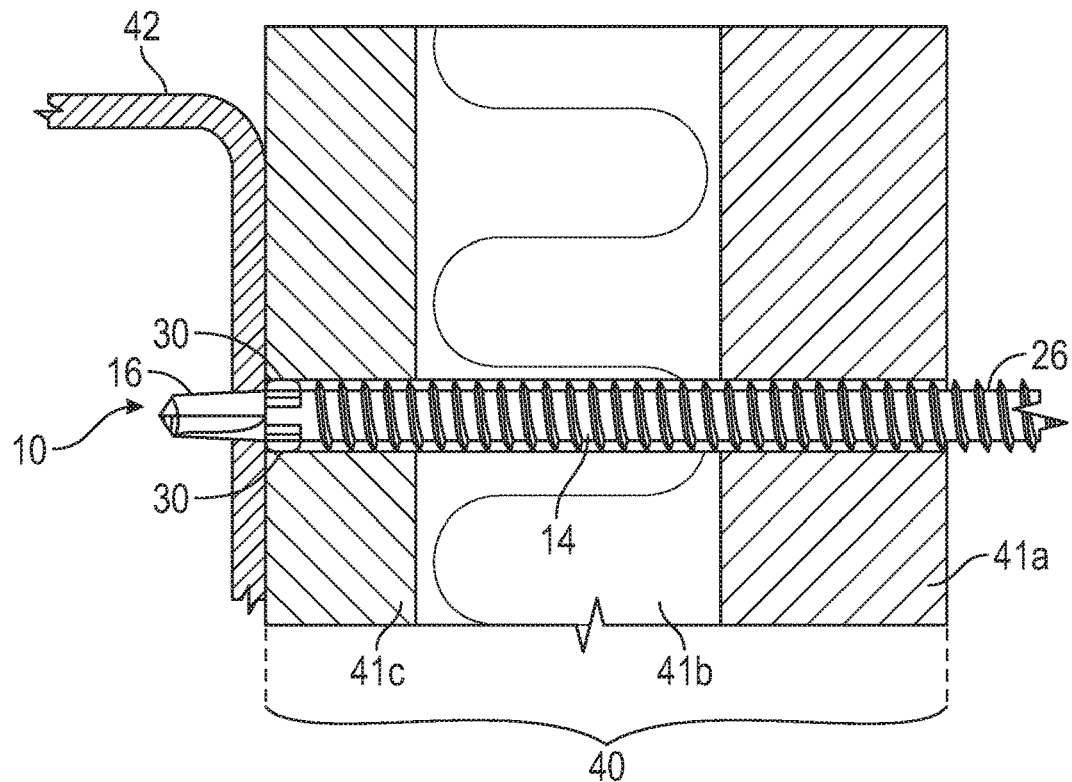
FIG. 3 is a side view of a portion of the threaded fastener of FIG. 1 illustrated in a second installation step.
Figure 4:
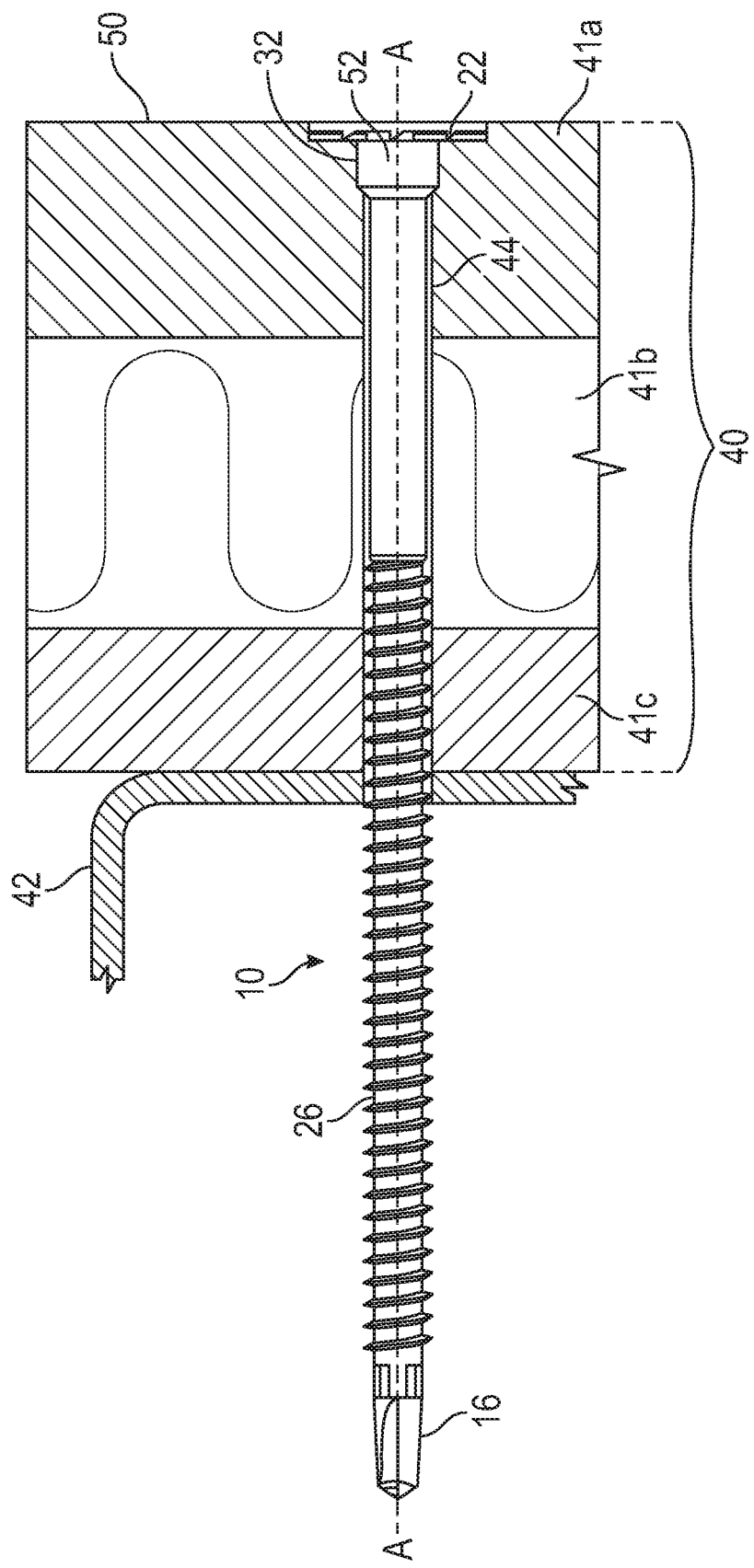
FIG. 4 is a side view of a portion of the threaded fastener of FIG. 1 illustrated in a third installation step.

Referring now to FIGS. 2, 3 and 4, the advancement of the threaded fastener 10 through both an insulation panel 40 and a steel substrate 42 is illustrated. In the illustrated embodiment, the insulation panel 40 is formed from a plurality of layers, such as an outer wood layer 41a, an intermediate foamular insulation layer 41b and an inner layer 41c. However, it should be appreciated that in other embodiments, the insulation panel 40 can have other layers, forms and structures. It should further be appreciated that in other embodiments, the threaded fastener 10 can be used with non-insulating panels. While the embodiment of the insulation panel 40 shown in FIGS. 2-4 illustrates the insulation panel 40 as having a substantially vertical orientation and the threaded fastener 10 as having a substantially horizontal orientation, in other embodiments the insulation panel 40 and the threaded fastener 10 can have other orientations.

Referring initially to FIG. 2, the tip 16 and the opposed wings 30 of the threaded fastener 10 drill through the layers 41a-41c of the insulation panel 40. The opposed wings 30 form a passage 44 through the layers 41a-41c of the insulation panel 40, with the passage 44 having the same diameter as the third diameter D3 of the opposed wings 30. As mentioned above, the third diameter D3 defined by the opposed wings 30 is greater than the second diameter D2 defined by the threaded portion 26 of the shank 14. Accordingly, the threaded portion 26 resides within the passage 44 without significantly engaging any portion of the passage 44 within the layers 41a-41c of the insulation panel 40.

Referring now to FIG. 3 in a next step, the tip 16 of the threaded fastener 10 engages and drills through the steel substrate 42. As the threaded fastener 10 continues to advance, the opposed wings 30 engage the steel substrate 42 and the steel substrate causes the opposed wings to fracture from the shank 14.

Referring now to FIG. 4 in a next step, the threaded portion 26 of the shank 14 engages the steel substrate 42 to further advance the threaded fastener 10 through both the layers 41a-41c of the insulation panel 40 and the steel substrate 42. When the threaded fastener 10 has been fully advanced through both the layers 41a-41c of the insulation panel 40 and the steel substrate 42, the enlarged portion 32 of the threaded fastener 10 is received within the outermost portion of the passage 44 formed in the outer wood layer 41a of the insulation panel 40. Since the diameter D4 of the enlarged portion 32 is the same as or slightly larger than the diameter D3 of the passage 44 in the outer wood layer 41a, the enlarged portion 32 fits tightly and seats within the passage 44. In this manner, the enlarged portion 32 provides a structure configured to resist movement of the insulation panel 40 in directions generally perpendicular to the longitudinal axis A-A of the threaded fastener 10.

Referring again to FIG. 4, as the enlarged portion 32 seats within the passage 44, the gripping features 22 engage an outer surface 50 of the outer wood layer 41a in a manner such as to further seat the threaded fastener 10 with the assembly of the layers 41a-41c of the insulation panel 40 and the steel substrate 42. While the gripping features 22 illustrated in FIGS. 1 and 4 have the form of pointed projections or teeth, in other embodiments, the gripping features 22 can have other forms, such as the non-limiting example of nubs, sufficient to engage an outer surface 50 of the outer wood layer 41a in a manner such as to further seat the threaded fastener 10 with the assembly of the layers 41a-41c of the insulation panel 40 and the steel substrate 42.

Advantageously, the threaded fastener 10 provides many benefits, although not all benefits may be present in all embodiments. First, the structure provided by the enlarged portion 32 is configured to resist movement of the insulation panel 40 in directions generally perpendicular to the longitudinal axis A-A of the threaded fastener 10. Finally, the threaded fastener 10 is self-contained, meaning that all drilling and fastening functions can be accomplished without the use of additional drill bits.

While the enlarged portion 32 of the threaded fastener 10 is shown in FIGS. 1 and 4 as having a substantially smooth and/or untextured outer surface 52, it is within the contemplation of the threaded fastener 10 that the outer surface 52 of the enlarged portion 32 can include surface features configured to further assist the engagement of the enlarged portion 32 with the outer layer 41a of the insulation panel 40. Non-limiting examples of surfaces features can include cross-hatchings, protrusions, raised letters and the like.

Figure 5A:
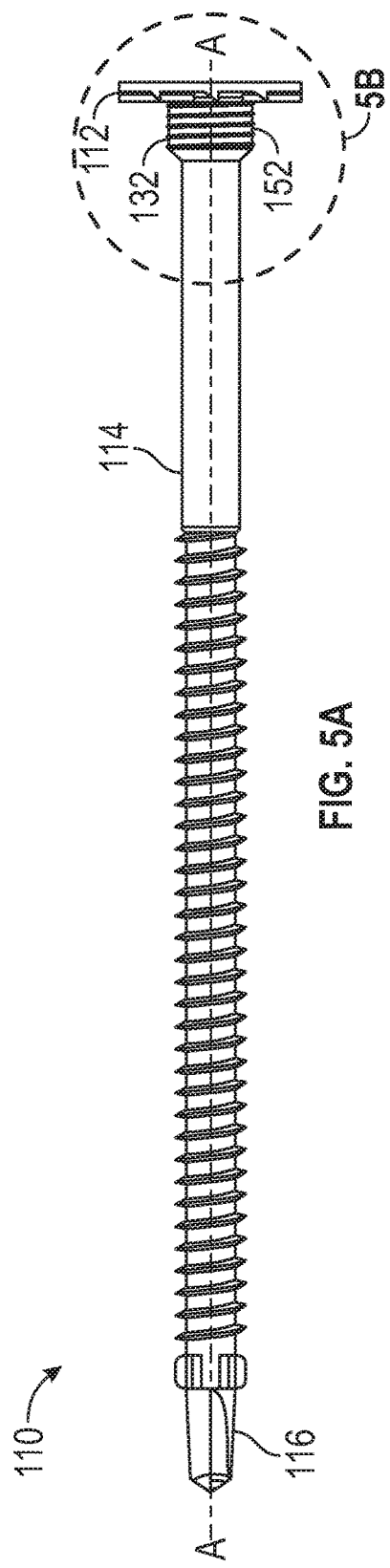
FIG. 5A is a side view of a second embodiment of a threaded fastener.

Referring now to FIG. 5A, a second embodiment of a threaded fastener 110 is illustrated. The threaded fastener 110 includes a head 112, a shank 114, a tip 116 and an enlarged portion 132. In the illustrated embodiment, the head 112, shank 114 and tip 116 are the same as, or similar to, the head 12, shank 14 and tip 16 illustrated in FIG. 1 and described above. However, in other embodiments, the head 112, shank 114 and tip 116 can be different from the head 12, shank 14 and tip 16.

Figure 5B:
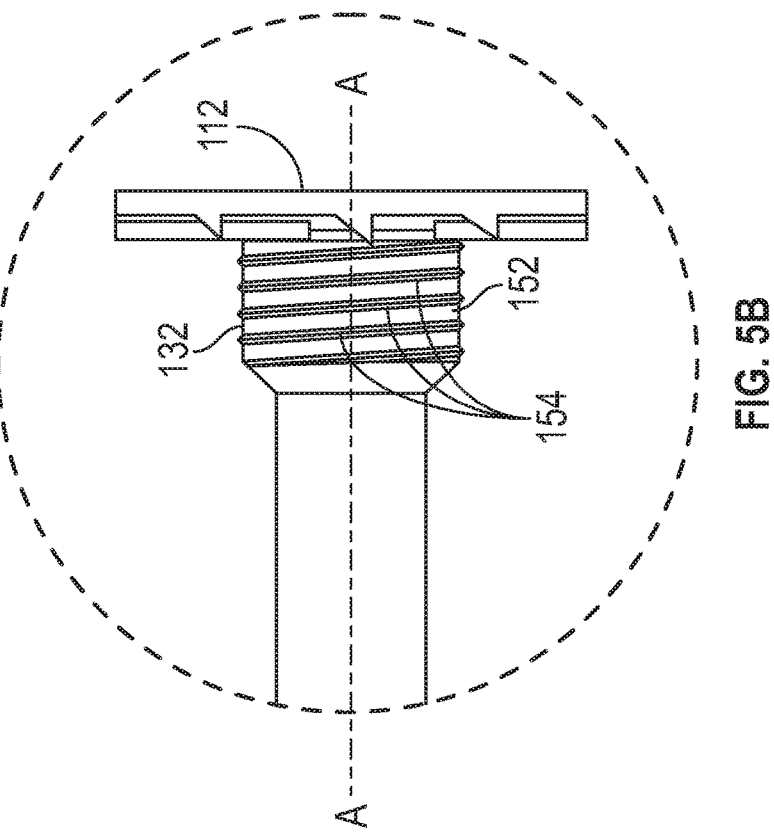
FIG. 5B is an enlarged side view of a portion of the second embodiment of the threaded fastener of FIG. 5A.

Referring now to FIGS. 5A and 5B, the enlarged portion 132 is the same as the enlarged portion 32 illustrated in FIG. 1 and described above with the exception that an outer surface 152 of the enlarged portion 132 includes a plurality of surface features 154.

Figure 6:
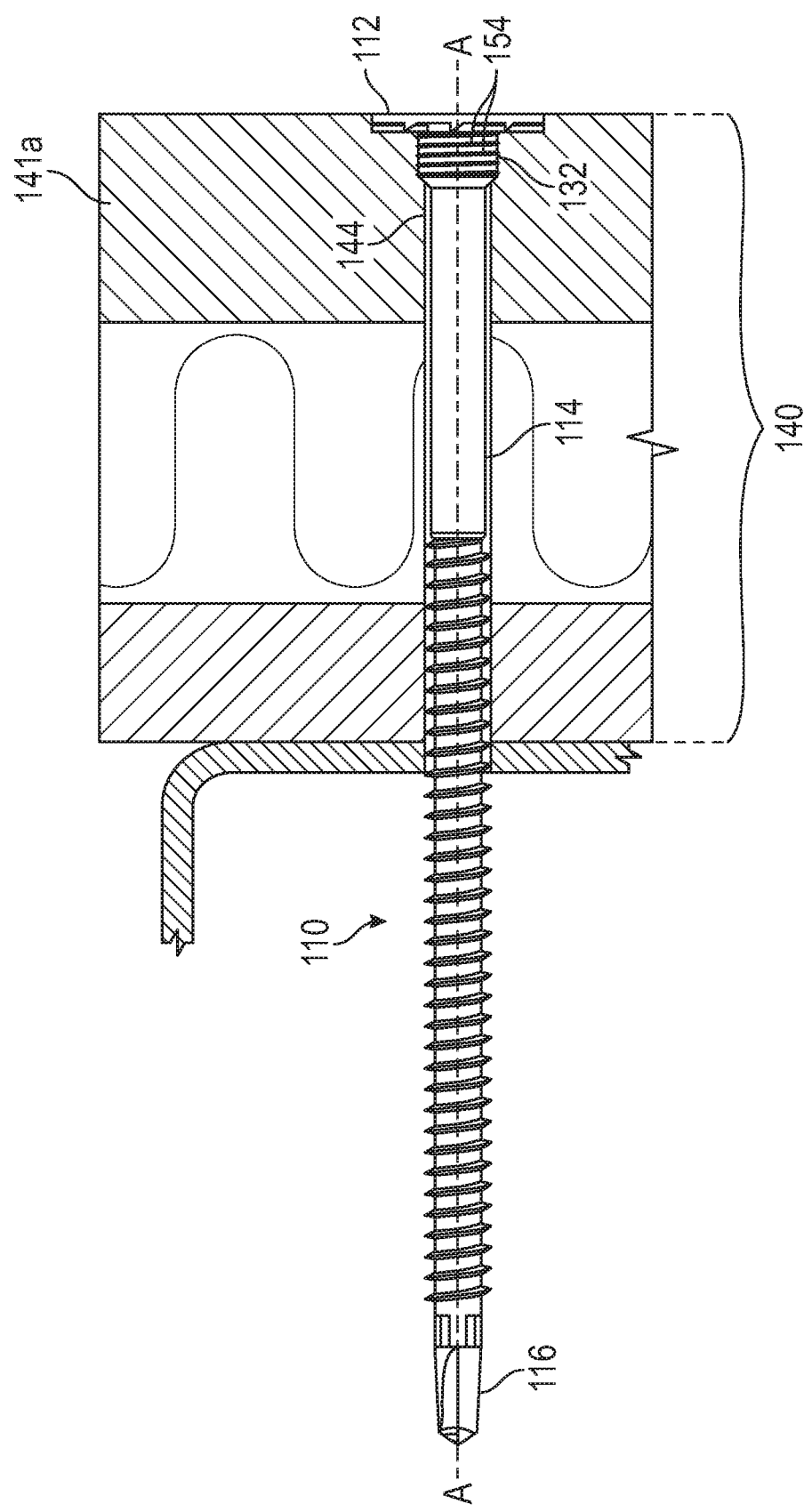
FIG. 6 is a side view of the threaded fastener of FIG. 5A illustrated in an installation arrangement.

Referring now to FIG. 6, the threaded fastener 110 is installed in the same manner as described above for the threaded fastener 10, with the added step that as the enlarged portion 132 of the threaded fastener 110 is received within the outermost portion of the passage 144 formed in the outer wood layer 141a of the insulation panel 140 and the enlarged portion 132 seats within the passage 144, the surface features 154 simultaneously engage outer wood layer 141a, thereby providing additional engagement of the enlarged portion 132 with the outer wood layer 141a.

In the embodiment illustrated in FIGS. 5A, 5B and 6, the surface features 154 have the form of continuous screw threads. However, in other embodiments, the surface features 154 can have other forms, such as the non-limiting examples of cross-hatchings, protrusions, raised letters and the like, sufficient to engage outer wood layer 141a and resist movement of the insulation panel 40 in directions generally perpendicular to the longitudinal axis A-A of the threaded fastener 10.

The principle and mode of operation of the threaded fastener has been described in certain embodiments. However, it should be noted that the threaded fastener may be practiced otherwise than as specifically illustrated and described without departing from its scope.

What is claimed is:

1. A threaded fastener comprising:
   a shank having a non-threaded portion and a threaded portion, the threaded portion defining a threaded portion diameter;
   a tip extending from the threaded portion of the shank;
   a plurality of wings extending from the shank and positioned between the tip and the threaded portion, the plurality of wings defining a wing diameter that is larger than the threaded portion diameter;
   a cylindrical enlarged portion extending from the non-threaded portion of the shank, the cylindrical enlarged portion defining an enlarged portion diameter that is equal to the wing diameter; and
   a head extending from cylindrical enlarged portion.

2. The threaded fastener of claim 1, wherein the tip includes a self-tapping drill feature configured to drill through a metallic substrate.

3. The threaded fastener of claim 1, wherein the plurality of wings has an opposed arrangement.

4. The threaded fastener of claim 1, wherein two opposed wings are provided.

5. The threaded fastener of claim 1, wherein the enlarged portion has a substantially smooth outer surface.

6. The threaded fastener of claim 1, wherein an outer surface of the enlarged portion includes surface features configured to engage a panel.

7. The threaded fastener of claim 1, wherein the head includes gripping features configured to engage a panel.

8. The threaded fastener of claim 6, wherein the surface features have the form of threads.

9. The threaded fastener of claim 6, wherein the surface features have the form of cross-hatchings.

10. The threaded fastener of claim 7, wherein the gripping features have the form of pointed projections.

11. The threaded fastener of claim 1, wherein the enlarged portion is positioned between the head and the non-threaded portion.

12. The threaded fastener of claim 1, wherein the enlarged portion contacts the head.

13. The threaded fastener of claim 1, wherein the wing diameter is greater than a diameter of the non-threaded portion of the shank.

14. The threaded fastener of claim 1, wherein the head includes an outer surface having a feature configured to engage an associated tool.

15. The threaded fastener of claim 14, wherein the feature is a hex structure.

16. The threaded fastener of claim 1, wherein the non-threaded and threaded portions of the shank, the tip, the head, the plurality of wings and the enlarged portion are radially centered about a common longitudinal axis.

* * * * *